(12) United States Patent
Rubin (10) Patent No.: US 8,381,439 B2
(45) Date of Patent: Feb. 26, 2013

(54) COMPRESSED GROWING MEDIUM INCLUDING CASTINGS

(76) Inventor: Patti D. Rubin, Aventura, FL (US)

(*) Notice: Subject to any disclaimer, the term of this patent is extended or adjusted under 35 U.S.C. 154(b) by 472 days.

(21) Appl. No.: 12/122,226

(22) Filed: May 16, 2008

(65) Prior Publication Data

US 2008/0287295 A1    Nov. 20, 2008

Related U.S. Application Data

(60) Provisional application No. 60/938,970, filed on May 18, 2007.

(51) Int. Cl.
*A01G 31/00* (2006.01)

(52) U.S. Cl. .......................................... 47/59 S
(58) Field of Classification Search ............ 47/59 S, 47/58.1 SC, 9, 73, 74
See application file for complete search history.

(56) References Cited

U.S. PATENT DOCUMENTS

| | | | |
|---|---|---|---|
| 2,971,292 A | 2/1961 | Malecki | |
| 3,524,279 A | 8/1970 | Adams | |
| 3,656,930 A | 4/1972 | Martin | |
| 3,656,932 A | 4/1972 | Scheuermann | |
| 3,733,745 A | 5/1973 | Ingerstedt et al. | |
| 3,842,537 A | 10/1974 | Bishop | |
| 3,962,823 A | 6/1976 | Zipperer, III | |
| 3,973,355 A * | 8/1976 | McKenzie | 47/59 R |
| 4,051,628 A | 10/1977 | Knapp et al. | |
| 4,128,508 A | 12/1978 | Munden | |
| 4,174,957 A | 11/1979 | Webb | |
| 4,185,987 A | 1/1980 | Tilkanen | |
| 4,318,248 A | 3/1982 | Muldner | |
| 4,351,754 A | 9/1982 | Dupre | |
| 4,407,092 A | 10/1983 | Ware | |
| 4,424,645 A | 1/1984 | Rannali | |
| 4,473,390 A | 9/1984 | Teufel | |
| 4,579,578 A | 4/1986 | Cooke | |
| 5,382,270 A | 1/1995 | Graham et al. | |
| 5,458,662 A | 10/1995 | Toyone | |
| 5,460,765 A | 10/1995 | Derdall et al. | |
| 5,477,640 A | 12/1995 | Holtkamp, Jr. | |
| 5,839,674 A | 11/1998 | Ellis | |
| 5,942,029 A * | 8/1999 | Spittle | 106/164.3 |
| 6,013,524 A | 1/2000 | Friars et al. | |
| 6,041,546 A | 3/2000 | Baranova | |
| 6,189,260 B1 * | 2/2001 | Kusey et al. | 47/9 |
| 6,219,968 B1 | 4/2001 | Belger et al. | |
| 6,391,120 B1 | 5/2002 | Silva | |

(Continued)

FOREIGN PATENT DOCUMENTS

| | | |
|---|---|---|
| CA | 1328744 C | 4/1994 |
| DE | 1145193 B | 3/1963 |

(Continued)

OTHER PUBLICATIONS

"Coir Could Quickly Gain Share in Growing Media Market," Henry Martinez, Greenhouse Management & Production, Jul. 1995.

(Continued)

*Primary Examiner* — Kristen C Hayes
(74) *Attorney, Agent, or Firm* — Holland & Hart LLP (57) ABSTRACT

A growing medium includes a bulking agent and an animal by-product, blended together and compressed at a volume-to-volume ratio ranging from about 7:1 to about 8:1, being substantially free of a water-soluble binder material. The bulking agent may also include organic and inorganic nutrients, beneficial for plant growth. Of particular interest is the incorporation of worm castings, a valuable form of organic nutrients.

13 Claims, 6 Drawing Sheets

U.S. PATENT DOCUMENTS

| | | |
|---|---|---|
| 6,403,134 B1 | 6/2002 | Nayyar et al. |
| 6,408,568 B1 | 6/2002 | Kusey et al. |
| 6,455,149 B1 | 9/2002 | Hagen et al. |
| 6,479,433 B1 | 11/2002 | Hann et al. |
| 6,582,637 B1 | 6/2003 | Phinney |
| 6,624,136 B2 | 9/2003 | Guerin et al. |
| 6,711,850 B2 * | 3/2004 | Yelanich et al. ............ 47/59 R |
| 6,793,915 B1 | 9/2004 | Guenin et al. |
| 6,863,027 B1 | 3/2005 | Silva |
| 7,059,083 B2 * | 6/2006 | Abitz et al. ................ 47/56 |
| 7,311,900 B2 | 12/2007 | Conover |
| 7,488,703 B2 | 2/2009 | Rubin |
| 7,587,856 B2 * | 9/2009 | Rubin et al. ............ 47/1.01 R |
| 2001/0030243 A1 | 10/2001 | Hurry et al. |
| 2002/0007592 A1 | 1/2002 | Mischo |
| 2002/0041860 A1 * | 4/2002 | Requejo ................ 424/76.1 |
| 2003/0065087 A1 | 4/2003 | Nambu et al. |
| 2003/0089035 A1 | 5/2003 | Courtemanche |
| 2003/0089152 A1 | 5/2003 | Yelanich et al. |
| 2003/0172699 A1 | 9/2003 | Phinney |
| 2004/0025422 A1 | 2/2004 | MacQuoid et al. |
| 2005/0141966 A1 | 6/2005 | Greene |
| 2006/0107589 A1 * | 5/2006 | Rubin .................. 47/59 S |
| 2007/0101644 A1 * | 5/2007 | Fujimaru et al. ........ 47/58.1 SC |
| 2009/0113791 A1 * | 5/2009 | Bertin et al. ............ 47/9 |
| 2009/0249686 A1 * | 10/2009 | Pacini et al. .......... 47/58.1 SE |

FOREIGN PATENT DOCUMENTS

| | | |
|---|---|---|
| EP | 0052526 A | 5/1982 |
| EP | 0487655 B1 | 5/1996 |
| FR | 2576745 A | 8/1986 |
| GB | 2308538 A | 7/1997 |
| JP | 03280811 A | 12/1991 |
| KR | 10-2003-0003992 A | 1/2003 |
| SE | 106170 | 12/1942 |
| WO | 91/03149 | 3/1991 |
| WO | 2006/055050 A1 | 5/2006 |

OTHER PUBLICATIONS

"Facts on Coir: Lessons from the Past," Lanka Santha, et al., Landscape Architect and Specifier News magazine, Feb. 1999.

"Coir Dust, A Viable Alternative to Peat Moss," Meerow, Alan W., Greenhouse Product News, 1997.

"The Potential of Coir (Coconut Mesocarp Pith) as a Peat Substitute in Container Media," Meerow, Alan W., Tropic Line, vol. 6, No. 2, Jul. 9, 2012.

"Coir (Coconut Mesocarp Pith) as a Peat Substitute," Meerow, Alan W., Tropic Line, vol. 7, No. 3, Jul. 9, 2012.

Website; www.composters.com, GREENCulture, Jun. 29, 2010 (2 pgs.).

\* cited by examiner

COMPRESSED GROWING MEDIUM INCLUDING CASTINGS

RELATED APPLICATIONS

This application claims the benefit under 35 U.S.C. §119 (e) of U.S. Provisional Patent Application No. 60/938,970 filed May 18, 2007, titled "Compressed Growing Medium Including Worm Castings." The provisional application is incorporated herein by reference in its entirety.

TECHNICAL FIELD

The present exemplary system and method relates to growing mediums and soils. More particularly, the present exemplary system and method relates to compressed growing mediums configured to expand when re-hydrated.

BACKGROUND

Pre-seeded soil mixtures, such as germinating mixes, potting soils, peat cubes and compressed pellets, have been used in forestry, agricultural, commercial, and home uses. These mixtures contain seeds dispersed in a soil mixture that is later deposited to allow the seeds to germinate and grow. These mixtures obviate time-consuming labor, such as digging, tilling and cultivating. Some mixtures are also used in indoor and outdoor pots and planters. Most soil mixtures are usually free from insects, diseases, and weeds. However, because of the favorable environment provided by the soil mixtures, the seeds tend to germinate during storage or transit before the mixture is deposited for its intended use. The resulting seedlings are bulky and often become root-bound, resulting in limited time periods for storage and transportation. The seeds or seedlings are also exposed to injury and to unfavorable environmental conditions, resulting in excessively high mortality rates.

In order to prevent early germination and seed mortality, soil mixtures have been compressed into soil wafers or pellets to provide easy modes of transporting the soil mixtures while precluding the water necessary for germination. However, these compressed wafers traditionally have not effectively prevented water intrusion or germination of the seeds.

Additionally, many traditional soil mixtures do not contain sufficient nutrients to sustain prolonged plant growth.

SUMMARY

A growing medium includes dehydrated and compressed animal by-products. Specifically, according to one exemplary embodiment, the animal by-product comprises of worm castings. As discussed herein, worm castings are an ideal nutrient for plant growth. According to one exemplary embodiment, the growing medium includes between 1 and 100% by weight worm castings. According to one exemplary embodiment, the growing medium includes between 20 and 70% by weight worm castings.

Additionally, the animal by-products above may be a blended with a bulking agent to provide a more complete growing medium. According to one exemplary embodiment, the dehydrated animal byproducts and a bulking agent are blended together and compressed at a volume-to-volume ratio ranging from about 3:1 to about 10:1, wherein the compressed growing medium is configured to re-hydrated to between 200 and 300 percent of its original volume.

Additionally, according to one exemplary embodiment, the bulking agent is impregnated with seeds, nutrients, fertilizers, fungicides, and other desirable materials that enhance the properties of the bulking agent as a growing medium. Furthermore, any micronutrients lost during dehydration and compression may be supplemented into the compressed bulking agent.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

An exemplary system and method for implementing a compressed growing medium with enhanced plant nutrients is disclosed herein. More specifically, a compressed growing medium is disclosed that contains dehydrated and compressed animal by-products. Of particular interest animal castings, such as worm castings, which provide ideal plant nutrients and several other beneficial properties described in greater detail below. Additionally, according to one exemplary embodiment, the compressed, dehydrated animal by-products are added to a bulking agent that includes a water-retentive polymer, but contains no binder material, such as polyvinyl alcohol (PVA).

According to one exemplary embodiment, a compressed growing medium includes a bulking agent and a dehydrated animal by-product blended together and compressed at a volume-to-volume ratio ranging from about 3:1 to about 10:1, wherein the compressed growing medium is configured to re-hydrated to between 200 and 300 percent of its original volume. The exemplary compressed growing medium including a dehydrated animal by-product may also include a water-retentive polymer.

Unless the context requires otherwise, throughout the specification and claims which follow, the word "comprise"

and variations thereof, such as, "comprises" and "comprising" are to be construed in an open, inclusive sense, that is as "including, but not limited to."

As used herein, and in the appended claims, the term "animal by-product" shall be interpreted broadly to include waste produced by any number of living organisms including, but in no way limited to, worms, insects, fowl, mammals, fish, and the like.

Numerous specific details are set forth for purposes of explanation and to provide a thorough understanding of the present system and method for implementing a compressed growing medium. It will be apparent, however, to one skilled in the art, that the present products and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

The present system and method provides a compressed growing medium including enhanced plant nutrients. Often, the act of dehydrating and compressing a growing medium reduces the nutrients present in the resulting compressed growth medium. Additionally, the incorporation of additional nutrients is often discouraged due to undesirable smells emitted by the added nutrients. The present exemplary system and methods address the existing needs by providing a bulking agent combined with dehydrated animal by-products, compressed to a ratio of between approximately 3:1 and 10:1. When hydrated, the compressed growing medium expands to between 200 and 300 percent of its original compressed volume. Particularly, according to one exemplary embodiment, the animal by-product includes worm castings. In addition to the above-mentioned ingredients, the present compressed growing medium may include, water retentive polymers, non-ionic surfactants, seeds, micro-nutrients, and/or perfumes. Further details of the ingredients of the present exemplary system and method will be described below, followed by a detailed description of exemplary manufacturing methods.

Figure 1:
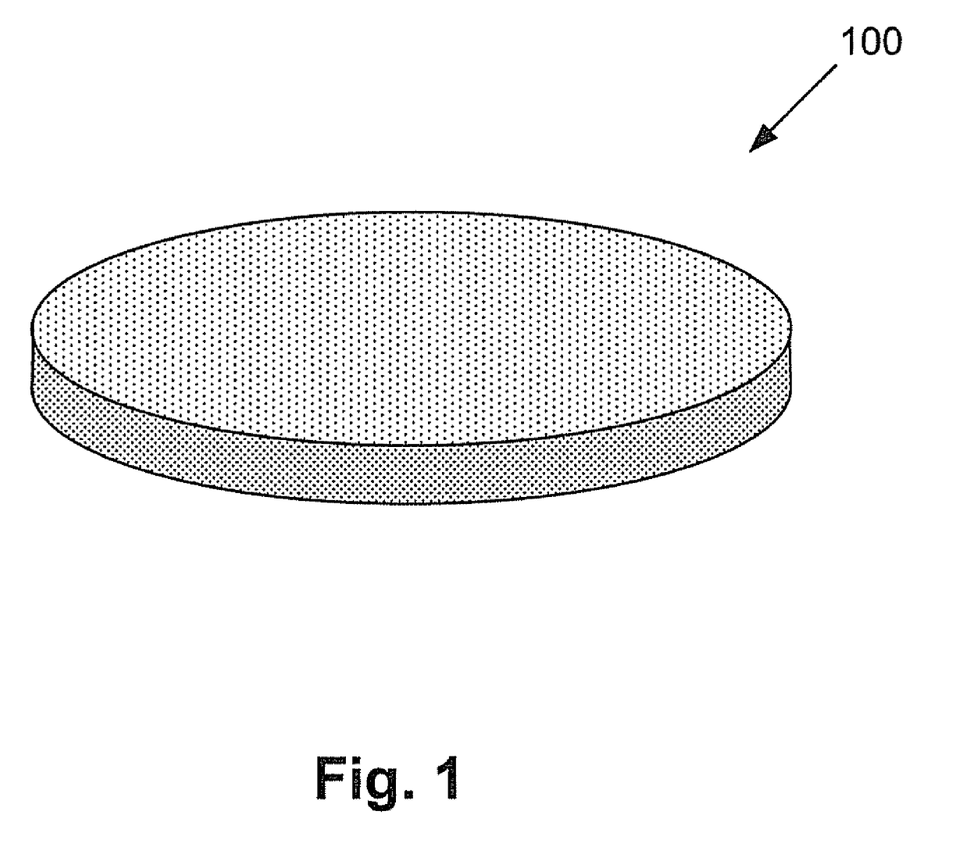
FIG. 1 is a perspective view of a compressed wafer of animal by-products, according to one exemplary embodiment.

According to one exemplary embodiment, and as illustrated in FIG. 1, the present growing medium includes dried animal by-products. Although various types of animal by-products may be used, of particular interest are worm castings. Worm castings are ideal for the compression and distribution of nutrients within a growing medium. The importance of worms in both soil quality and plant growth is easily overlooked. While difficult to manage due to the high water content, in a dehydrated state worm casting provide a high nutrient content and several other benefits to plants that will be described below.

Worm castings are truly an ideal, natural fertilizer; it is has been found to be rich in nitrate nitrogen, phosphates, potassium, and magnesium. Tests have demonstrated the nitrogen content of worm castings to be five times greater than that of ordinary topsoil; additionally the phosphate was found to be seven times greater, the potash eleven times greater, and the magnesium three times greater than in ordinary topsoil.

There are several known benefits worm castings provide to soils. According to the system and method described herein, dehydrated worm castings provide similar benefits to soils and bulking agents. Several benefits of worm castings is that they provide: increased organic matter, a rich source of humus, a valuable balanced nutrition for plants, abundant beneficial microorganisms. In addition, worm castings help prevent several common diseases and resist certain pest insects. Specifically, worm castings suppress fungal diseases such as phythium, fusarium, dollar spot, and the like and are considered an effective way to repel white flies, aphids and spider mites and other pests that feed on plant juices. Applying earthworm castings to the soil around plants increases the production of a certain enzyme that is offensive to many insects.

Several animal by-products, while known for their nutritional qualities are also know for their strong odors; such odors often make them impractical for some applications. Another primary benefit of worm castings over many animal by-products is that they can be used indoors and in other odor sensitive locations because worm castings are odorless.

Worm castings traditionally have seen limited use. Particularly, the high moisture content has given rise to several complications that have precluded them from large-scale use. According to one exemplary embodiment of the present system and method, worm castings are dehydrated prior to their use. Dehydration can be performed in any of the methods commonly used to dehydrate materials high in water content. According to one exemplary embodiment, dehydration of the worm castings may be performed by exposing the worm castings to the atmosphere while manually turning or rotating them. As the castings are exposed to the atmosphere, moisture will escape the castings and enter the air. Another method includes placing the worm castings in a tumble dryer, thereby rotating the castings while exposing them to air. According to one exemplary embodiment, the air in the tumble dryer may be heated.

The worm castings, once dehydrated may be compressed into wafers (100, FIG. 1) and distributed. By adding water, the compressed, dehydrated worm castings will expand and provide the above-mentioned benefits to any soil they are added to. The worm castings will provide a sustained release of nutrients to the soils for an extended period of time. Worm castings, blended with soils or bulking agents combine to create a particle matrix that prevents soil erosion. As previously mentioned, while worm castings are particularly useful, many varieties of castings and other animal by-products may be substituted for worm castings and provide similar benefits.

Alternatively, according to one exemplary embodiment, the worm castings are blended with a bulking agent prior to compression. By adding a bulking agent and then compressing both the worm casting and the bulking agent together, the worm castings are evenly distributed in the bulking agent.

According to on exemplary embodiment, a bulking agent is intermixed with animal by-products, such as worm castings, to provide a fertile medium for plants to germinate and grow. The added worm castings provide an ideal nutrient delivery system. The worm castings, or other animal by-product is blended with the bulking agent prior to any compression. The nutrient rich bulking agent blended with the worm castings is compressed for ease of transport and, upon re-expansion to as much as 300 percent of the original volume, the nutrients are distributed evenly throughout the growing medium. Seeds and plants, whether pre-impregnated into the compressed bulking agent, or planted subsequent to the expansion of the bulking agent have access to an ideal fertile growing area.

According to one exemplary embodiment, a hydrophilic fibrous bulking agent forms the majority of the growing medium. Generally, the bulking agent ranges from about 50% to about 98% by volume or between 40 and 60% by weight of the growing medium. Due to the freshness and the compression ratio of the bulking agent, the re-hydrated medium expands to between 200 and 300 percent of the original uncompressed volume. Additionally, the mixture, compression, and subsequent expansion of the bulking agent aids in the distribution of the animal by-product throughout the growing medium. Examples of the bulking agent include coir, peat, cotton, mineral wool, paper pulp, peat bark, birch bark, wool and/or hair. In one embodiment the bulking agent comprises coir, including coir fibers and/or coir dust. The bulking agent used in the growing medium may be dehydrated, having a moisture content of about 15% or less, and more preferably of about 11% or less. While some moisture assists in maintaining the structural integrity of the growing medium during transport and handling, using a dehydrated bulking agent helps maintain the potency of all growing medium components.

According to another exemplary embodiment, the bulking agent that is used in the growing medium is a low-compressed bulking agent being compressed at a volume-to-volume ratio of about 3:1. By using a low-compressed bulking agent the speed of rehydration and expansion of the growing medium is increased, and the expanded volume of the growing medium is usually equal to or greater than its volume before being dehydrated and compressed. The combination of a dehydrated, low-compressed bulking agent also maintains the growing medium substantially free from all insects, diseases and weeds.

The grind size of the bulking agent helps to control the structural integrity of the growing medium even when wet. Generally, the grind size of the bulking agent depends on various factors of the growing medium, such as its size in compressed form, the size and type of any seeds included in the growing medium, and the amount of water drainage needed. Thus, the grind size is influenced by the location of use of the growing medium since the atmospheric conditions of locations vary from arid to humid, and since different climate zones support different types of seeds. Generally, the bulking agent grind size range from being able to pass through an approximately ⅛ inch mesh screen to being able to pass through an approximately 1 inch mesh screen. However, it is conceivable that the grind size might be modified for a specific application to be much smaller than one $⅛^{th}$ of an inch or to be much larger than 1 inch.

The bulking agent may also include any added natural porous substrate that enhances the bulking agent, including enhancements such as adding beneficial nutrients or improving water drainage. Examples of suitable natural porous substrates include, but are not limited to, pine bark, fir bark, redwood bark, hardwood bark, polystyrene foam, sawdust, rock wool, perlite, vermiculite, scoria, composted organic materials, shale rock, calcined clay pellets and volcanic pumice. These porous substrates enhance the rate of water percolation or drainage pulled by gravity and the quantity of water stored after drainage.

Furthermore, according to one exemplary embodiment, the blended mixture of dehydrated animal by-products and a bulking agent may, according to one exemplary embodiment, include one or more water-retentive polymers. These polymers, also called superabsorbing polymers (SAP's), are hydrophobic materials that can absorb fluid and retain it under pressure without dissolution in the fluid. These polymers, when wetted later will form a gel within the expanded bulking agent. The gel created by the polymers distributes the nutrients provided by the worm castings or other animal by-products evenly throughout the expanded bulking agent. An additional benefit is that in conjunction with the worm castings, the gel created by the wetted polymers forms a matrix that both prevents soil erosion and prevents migration of the bulking agent.

The materials used in water-retentive polymers are, according to one exemplary embodiment, synthesized by one of two routes. In the first, a water-soluble polymer is cross-linked so that it can swell between cross-links but not dissolve. In the second, a water-soluble monomer is co-polymerized with a water-insoluble monomer into blocks. Generally, the water-retentive polymer is a non-foamed polymer. Suitable water-retentive polymers include, but are not limited to, saponified starch graft polyacrylonitrile copolymers, polyacrylic acid, polymalsia anhydride-vinyl monomer superabsorbents, starch-polyacrylic acid grafts, polyacrylonitrile based polymers, cross-linked polyacrylamide, cross-linked sulfonated polystyrene, cross-linked n-vinyl pyrrolidone or vinyl pyrrolidone-acrylamide copolymer, and polyvinyl alcohol superabsorbents. These polymers absorb many times their own weight in aqueous fluid. Additional suitable water-retentive polymers include, but are not limited to sodium propionate-acrylamide, poly(vinyl pyridine), polyethylene imines, polyphosphates, poly (ethylene oxide), vinyl alcohol copolymer with acrylamide, and vinyl alcohol copolymer with acrylic acid acrylate.

In one exemplary embodiment the water-retentive polymer is either a potassium or sodium based polymer, such as a synthetic polyacrylate/polyacrylamide copolymer. Like many absorbent polymers, it can absorb many hundred times its weight in water. In another embodiment, the absorbent polymer is acrylamide/potassium acrylate copolymer. Potassium-based polymers are non-toxic and do not cause harm to the environment. Additionally, potassium is a nutrient that promotes plant development. Generally, the water-retentive polymer used ranges up to about 25% by dry weight of potassium acrylate acrylamide copolymer, more preferably in an amount from about 2% to about 15% by dry weight of the growing medium.

The growing medium, according to one embodiment, includes a non-ionic surfactant or emulsifier that wets the dry hydrophilic bulking agent and decreases surface tension that would otherwise prevent water take up. Consequently, the surfactant increases the rate at which the bulking agent absorbs water. Furthermore, according to one exemplary embodiment, the non-ionic surfactant enables even distribution of the nutrients provided by the worm castings. Suitable surfactants include, but are not limited to polyoxypropylene-polyoxyethylene block co-polymers; alkanol amides, betamol derivatives; block co-polymers comprising a series of condensates of ethylene oxide with hydrophobic bases formed by condensing propylene oxide with proylene glycol; ethyoxylated compounds comprising alcohols, alkyl phenols, amines and amides, alkylphenol ethoxylates, fatty alcohol polyglycol ethers, oxo-alcohol polyethylene glycol ethers, alkylphenol-ethoxylates, fatty or oxo-alcohol polyethylene glyco ethers, and hydrophilic and hydrophobic block copolymers. In one embodiment the non-ionic surfactant is polyoxypropylene-polyoxyethylene block copolymer in an amount from about 0.001% to about 3.5% by dry weight of the total matrix.

The growing medium, according to one exemplary embodiment, is free of a water-soluble binder material. Conventional growing media having a water-retentive polymer also contain a water-soluble binder material, such as polyvinyl alcohol (PVA), polyvinyl acetate or a polyacrylate, to bind a growing medium together when wet and help to maintain the structural integrity of the growing medium. However, the compressed growing medium described herein does not require a binder material to maintain its structural integrity, and thus contains no PVA or other binder material.

During the dehydration process of the worm castings or other animal by-product some micronutrients may be lost. Furthermore, compression of the worm castings or the worm castings in conjunction with one of the various bulking agents described above may cause valuable micronutrients to be lost. To remedy this, according to one exemplary embodiment, the worm castings or blended worm castings and bulking agent may be supplemented with additional micronutrients.

Furthermore, as previously discussed with regards to a number of animal by-products, often the odors released from these nutrient rich materials are undesirable. According to one exemplary embodiment, the animal by-product, or animal by-product blended with a bulking agent, also includes a chemical to serve as a perfume. Chemicals that are non-toxic to plants that provide a strong pleasant or natural smell added to the animal by-product overcome the unpleasant odors of the animal by-product, making it suitable for a greater extent of uses. Even with odorless worm castings, perfumes or other chemicals may be added to provide a pleasant smelling natural fertilizer. It is also conceivable that the chemical or perfume may be tailored to repel or otherwise deter pests and predators from the plant and surrounding area. According to one exemplary embodiment, the perfume material is formed in the SAP. According to this exemplary embodiment, when the SAP is hydrated and expands, the perfume is released, thereby generating the desired odiferous atmosphere. Further details of the incorporation of a fragrant polymer can be found in U.S. patent application Ser. No. 10/959,378 filed Apr. 6, 2006 and titled "System and method for a fragrant polymer configured for use in a growing medium," which application is hereby incorporated by reference in its entirety.

The growing medium may contain various other components. In one embodiment, the compressed growing medium includes seeds, thereby forming a pre-seeded compressed growing medium. The pre-seeded, compressed growing medium protects seeds against injury and enhances the conditions for germination and growth of seeds and plants.

The compressed growing medium may also contain other components, such as fertilizers, nutrients, pesticides, insecticides, fungicides, hormones, steroids, plant growth enhancers, or other beneficial components known to those of skill in the art.

According to one exemplary embodiment, the dehydrated worm castings or other animal by-product are blended and then compressed into pellets (100, FIG. 1) and are subsequently reground. That is, the pellets may be ground into smaller sizes to produce a mixture of worm castings, bulking agents, and any of the other materials mentioned above to form a matrix that appears substantially equivalent to typical soils. This is beneficial in that it will appear and be used equivalent to typical soils while still providing the space compaction for transportation and still expanding significantly when exposed to water. Additionally the reground blend includes a random assortment of sizes, thereby creating an uneven matrix that when mixed with seeds maintains an even seed distribution when in a shake container. Further details of the incorporation of a fragrant polymer can be found in U.S. patent application Ser. No. 11/510,043 filed Mar. 22, 2007 and titled "Compressed growing medium," which application is hereby incorporated by reference in its entirety.

Exemplary Methods

Figure 2:
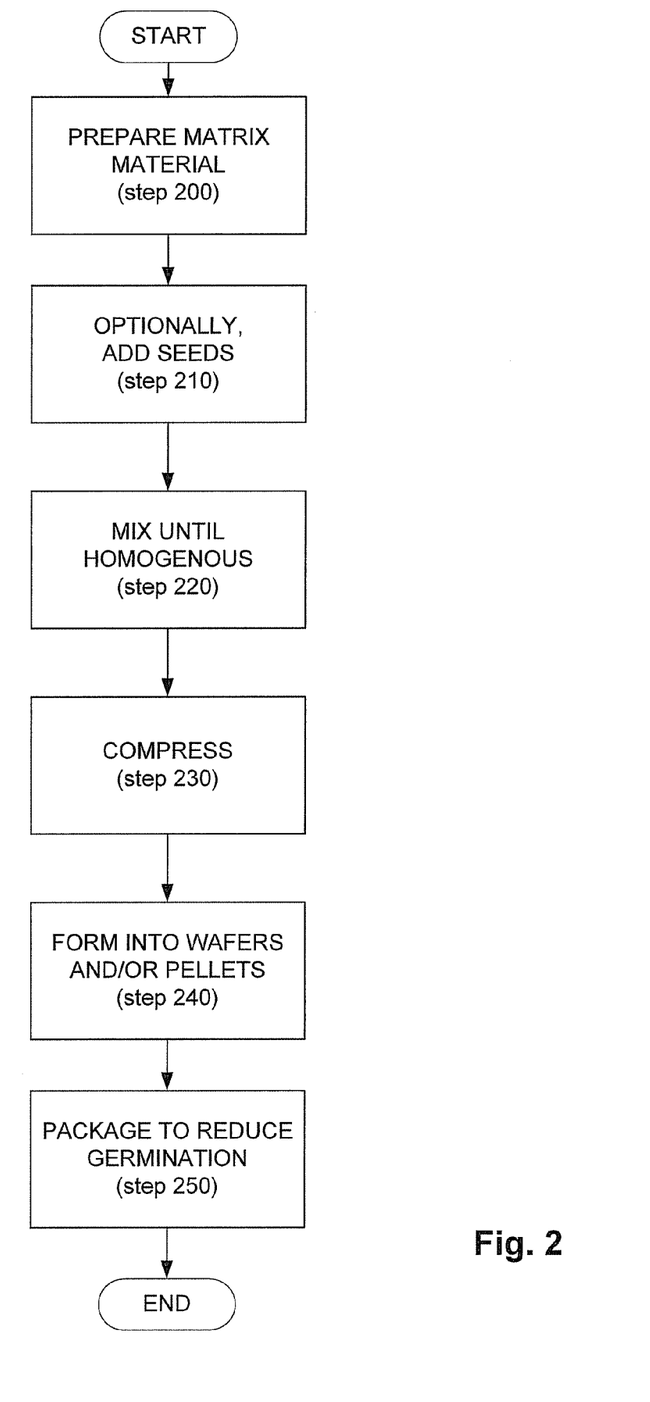
FIG. 2 is a flow diagram depicting a method of making a compressed soil mixture, according to one exemplary embodiment.

FIG. 2 depicts an exemplary method of making a compressed growing medium, both pre-seeded and non-seeded. The coir and/or other bulking agents are first dehydrated to about 25% moisture content in an air-circulating oven set to approximately 95° C. (step 200). Preferably, the bulking agent is dehydrated to 15% or less humidity, and more preferably to about 11% or less humidity. If necessary, the bulking agent is also decompressed to a volume-to-volume ratio of about 3:1 or less. In order to form a pre-seeded growing medium, seeds may be optionally added to the mixture (step 210). The growing medium components, including the bulking agent, the optional water-retentive polymer, the non-ionic surfactant, the dried animal by-product, and any other additional components, are then blended together with a roller drum (step 220). At this point, animal by products such as worm castings, previously dehydrated as described above, may be added and blended with the bulking agents and other materials.

The blended growing medium including the animal by-products, whether pre-seeded or non-seeded, is compressed at a volume-to-volume ratio ranging from about 7:1 to about 8:1 in order to provide a compressed growing medium suitable for packaging, shipment and sale (step 230). The growing medium is typically compressed into bricks, slabs, wafers, pellets and any other shape (step 240). If the compressed growing medium includes seeds, its size and shape may be determined by the size of the included seeds and what is necessary to protect those seeds during compression. The terms "wafer" and "pellet" as used herein are not limited to any one shape, but may include shapes that are spherical, elliptical, egg-shaped, square, rectangular, crescent, convex, concave, flat or any other regular or irregular shape. The compressed bricks, slabs, wafers and pellets may then be packaged in pouches, grow-bags, cans, canisters, jars, boxes, and other similar packages (step 250).

Figure 3:
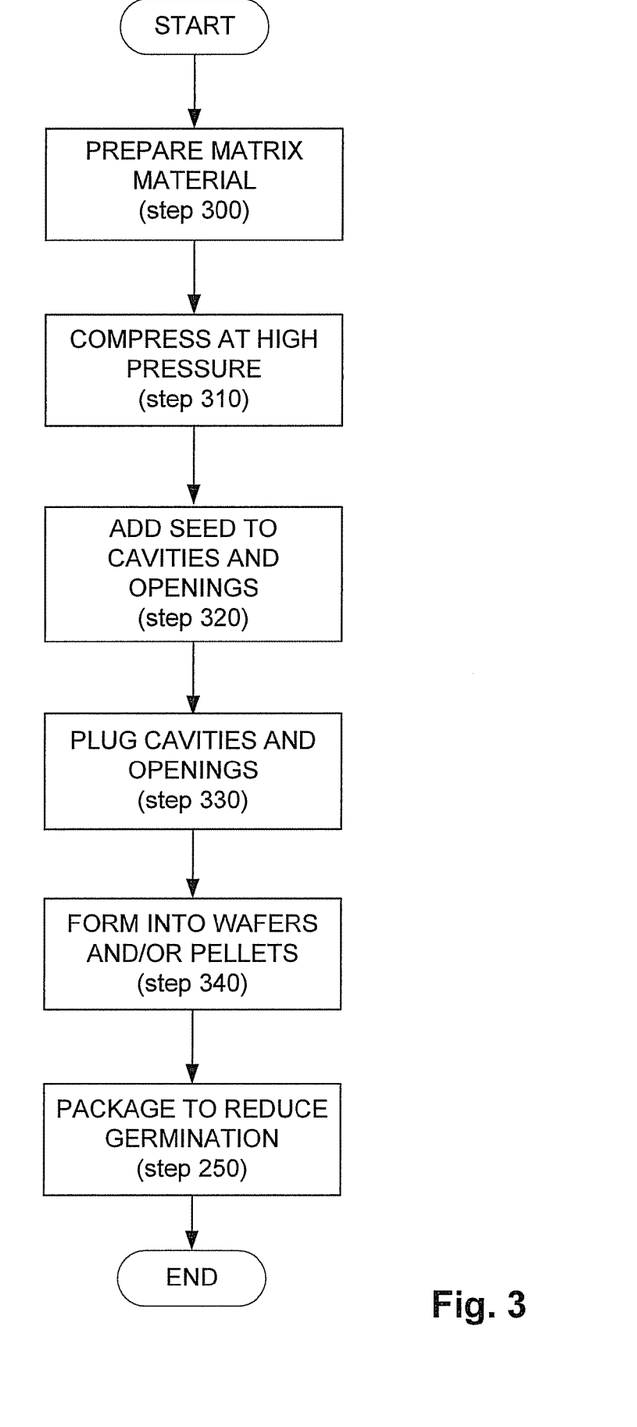
FIG. 3 is a flow diagram depicting a method of making a compressed soil mixture, according to one exemplary embodiment.
Figure 4:
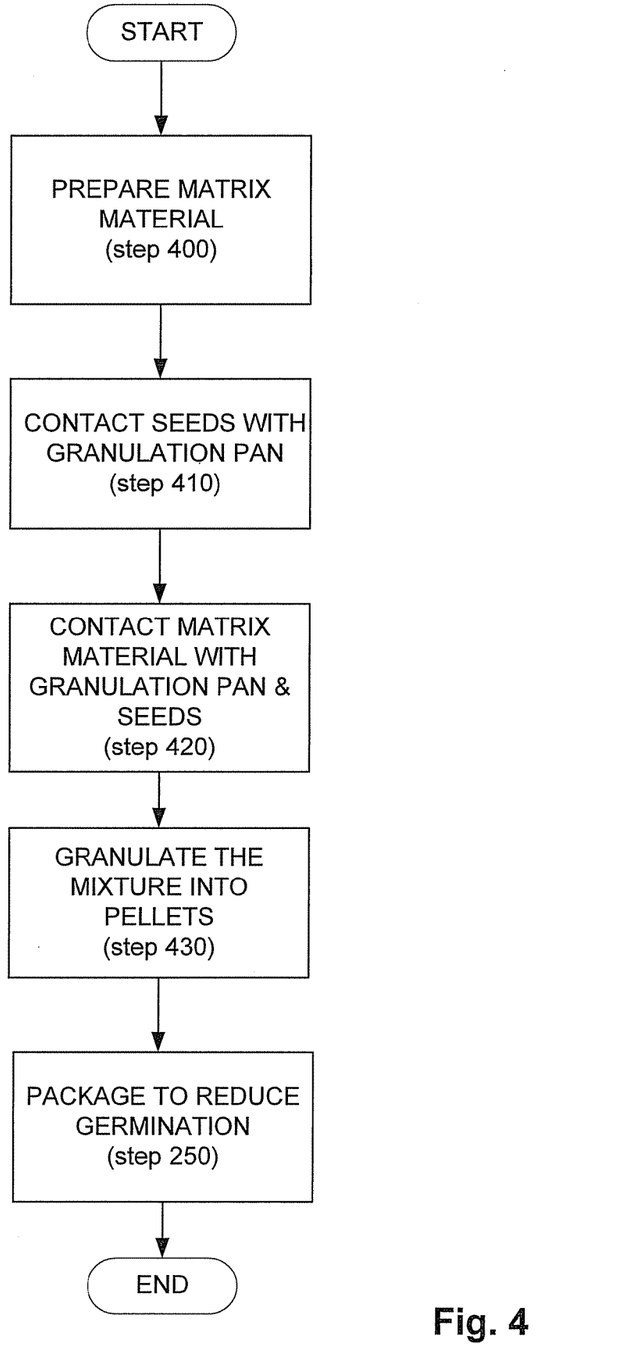
FIG. 4 is a flow diagram depicting a method of making a compressed soil mixture, according to one exemplary embodiment.

FIGS. 3 and 4 depict various alternative embodiments of methods of making pre-seeded, compressed growing medium wafers and pellets. In one embodiment, as shown in FIG. 3, a pre-seeded, compressed growing medium wafer is made by first preparing a growing medium from the above-described components (step 300), including any desired dehydrated animal by-products. This growing medium is then pressed at high pressures (step 310). According to one exemplary embodiment, an adequate pressure is approximately 7500 pounds per square inch. The resulting compressed medium naturally contains holes and or cavities, or, as necessary, holes and cavities may be formed in the compressed medium before the seed is added to the growing medium (step 320). The size of the cavity to hold the seed is determined by the size of the particular seed type used. Once the seed is placed in the cavity, the cavity opening is plugged (step 330) with a suitable material that will remain in place once dried and that is not toxic to the seed or germinating plant. In one exemplary embodiment, the growing medium cavities are plugged with a paste including 50% by dry weight dry peat and 50% by dry weight of an aqueous solution containing 11.25% by dry weight PVA (Elvanol™ 7130, E.I. du Pont de Nemours and Company) and 0.125% by dry weight non-ionic surfactant (Pluronic L-92, BASF). Other material may be used to plug the cavity including silicate clays. The compressed growing medium is then formed into wafers and pellets (step 340) and then packaged for sale (step 250).

Heat may be released during the pressing process. Consequently, it may be necessary to design the pressing device and to carry out the pressing process in a manner to maintain the temperature of the different constituents of the wafers or pellets, and in particular the temperature of the grains of seed contained therein, from exceeding 35° C., and preferably from exceeding 30° C., so that the germinating ability of the grains of seed will not be negatively affected. After the wafers or pellets have been pressed, or possibly while they are being pressed, they may be cooled to a normal room temperature of about 20° C. to 27° C., such as by passing an air stream through them or by exposing them to ambient temperature.

In another embodiment, shown in FIG. 4, compressed seed pellets are formed by first preparing a growing medium (step

400). The growth medium, as above, comprises any various described bulking agents and an animal by-product such as worm castings. Typically, as described above, the worm castings or other by-product are dehydrated prior to their mixture with the bulking agents and other materials. A source of agronomic seeds are then contacted with a granulation pan (step 410). The growing medium is then contacted with the granulation pan (step 420) and the mixture is granulated (step 430) in the granulation pan to form pellets of encapsulated agronomic seeds. The compressed seed pellets may then be packaged (step 450), as described below.

Other methods for forming compressed pellets include spraying seeds while rotating in a mixer, the use of drum coaters, fluidized bed techniques, Wurster air suspension coating processes, pan coaters and spouted beds. In each of these methods the seeds may be pre-sized prior to coating.

Figure 5:
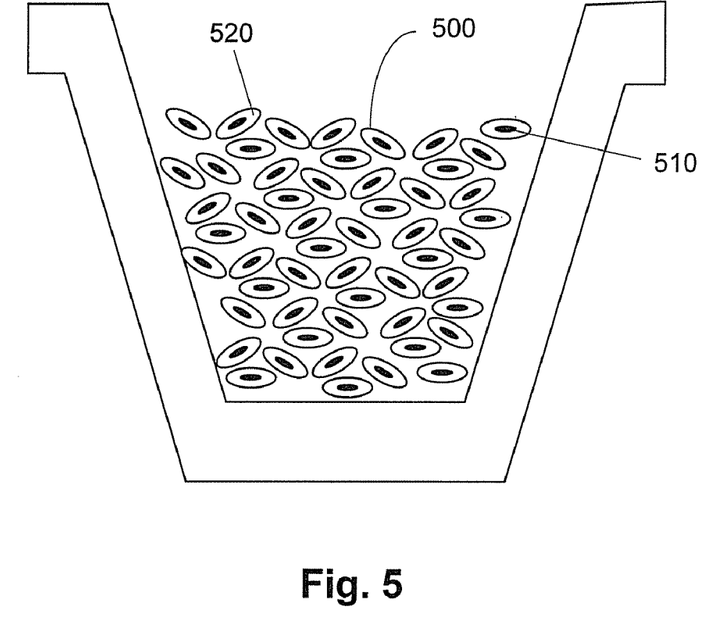
FIG. 5 is a cutaway side view of a compressed soil pellet mixture, according to one exemplary embodiment.
Figure 6:
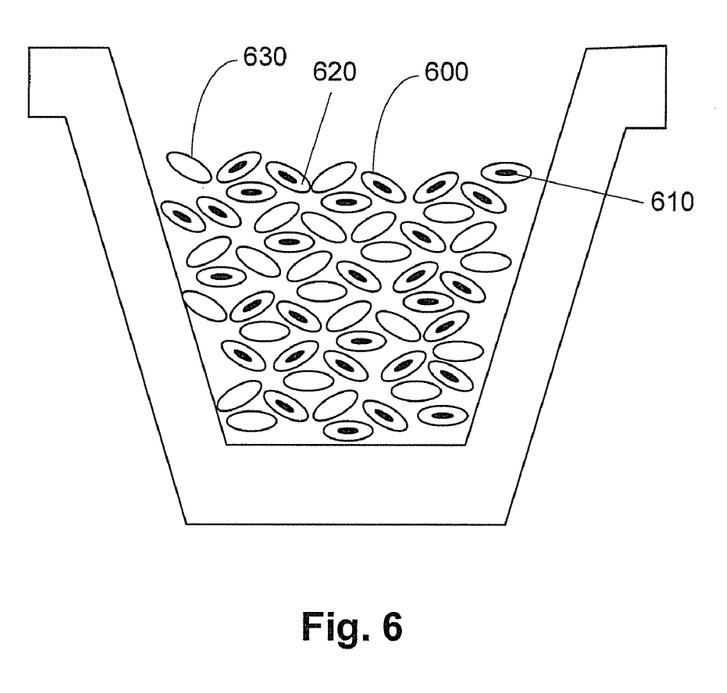
FIG. 6 is a cutaway side view of a compressed soil pellet mixture, according to one exemplary embodiment.
Figure 7:
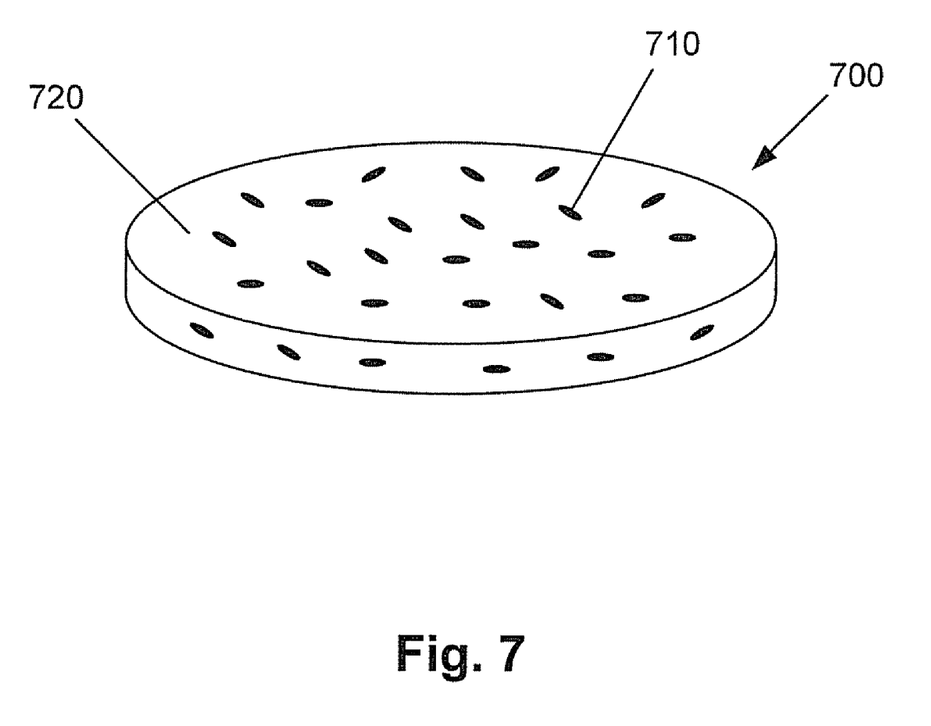
FIG. 7 is a perspective view of a compressed soil wafer, according to one exemplary embodiment.

As shown in FIGS. 5-7, the pre-seeded compressed growing medium wafers (700) and pellets (500, 600) generally contain seeds (510, 610, 710) uniformly dispersed throughout the soil mixture (520, 620, 720). The seeds (510, 610, 710) used in the growing medium may include, but are not limited to, seeds for vegetables, flowers, trees, grasses, herbs, grains, crops, and other plants. The wafers (700) and pellets (500) each contain at least one grain of seed, but may contain, depending on the type and size of the grains of seed, at least 2, preferably at least 4. The number of seeds in a pellet or wafer clearly depends upon the size of the wafers and the size of the seeds; both the size of the wafer or pellet and number of seeds within may be pre-determined and configured for various specific applications. The grains of seed (510, 610, 710) are generally distributed uniformly over the entire volume of the wafers or pellets. In one embodiment the wafers (700) and pellets (500, 600) contain a variety or mixture of any of the above seeds. In one embodiment, shown in FIG. 5, the growing medium includes compressed pellets (500) in which each pellet (500) includes a seed (510), such as grass seeds, encapsulated in the growing medium (520). This embodiment is particularly useful in creating large, grassy areas such as in sports arenas, parks and playing fields. In a further embodiment, shown in FIG. 6, some of the compressed pellets (600) include seeds (610) encapsulated in the growing medium (620) while other pellets (630) contain a growing medium (620), but have no seeds.

As illustrated in the exemplary methods mentioned above, the pre-seeded, compressed growing medium wafers and pellets can be packaged to minimize and reduce germination of the seeds during storage and transport (step 250). Since many factors contribute to seed germination, such as seed viability, ambient moisture, proper temperature, ample oxygen, and light, many methods are available to alter these factors to reduce seed germination during storage and transport. Maintaining humidity and/or oxygen levels at the lowest possible levels in the packaging is an efficient way of reducing premature seed germination. Suitable methods for producing a dehydrated packaging include vacuum packing, pillow packing, controlled atmosphere packing, modified atmosphere packing, desiccant packing, and other methods known to those of skill in the art.

In one embodiment the pre-seeded, compressed growing medium wafers and pellets are vacuum-packed. Vacuum packing is a process whereby air and/or the water in the packaging are evacuated from a storage bag or container, thus decreasing the oxygen content and humidity in and around the soil mixture. Generally, any process or apparatus known to those of skill in the art may carry out the vacuum-packing process. Conventional vacuum-sealing or vacuum-packing machinery may be used, such as external clamp pouch machines, external clamp snorkel machines (also known as retractable nozzle machines) and chamber machines.

In other exemplary embodiments, the wafers and pellets are packaged by pillow packing, controlled atmosphere packing or modified atmosphere packing. In these methods, after the growing medium is vacuum-packaged a gas or combination of gases is injected into the package to yield a package that has substantially all atmospheric oxygen removed but is not drawn down tight around the growing medium. Suitable gases include, but are not limited to nitrogen, carbon monoxide, carbon dioxide, sulfur dioxide, and inert gases such as helium, argon, xenon and neon. The added gas or gases reduces the pressure generated by the package on the growing medium and seeds. These anoxic packages contain little to no oxygen, thus greatly inhibiting seed germination while permitting a higher moisture content to help maintain the integrity of the growing medium structure. In another embodiment, the compressed growing medium is vacuum freeze dried before packing.

In yet another embodiment, the growing medium is packaged with a desiccant to reduce the ambient humidity. Suitable desiccants include, but are not limited to, silica gel, clays, calcium oxide, calcium sulfate, calcium chloride, molecular sieves, charcoal, alumina, alumino silicate, calcium fluoride, lithium chloride, starches, a zeolite, barium oxide, magnesium perchlorate, glycerin, calcium hydride, phosphoric anhydride, phosphoric acid, potassium hydroxide, sulfuric acid, ethylene glycol, barium oxide, sodium sulfate and combinations thereof. In another embodiment, inert gas may also be introduced into the package to replace air and/or moisture. Including a desiccant or inert gas significantly reduces humidity, thus greatly reducing seed germination.

The packages used for packaging the growing medium according to the above methods include, but are not limited to jars, cans, plastic pouches, standard flat vacuum pouches, and other packages known to those of skill in the art. In one embodiment the package comprises vacuum pouches made of multi-layered nylon and polyethylene. In another embodiment the package comprises plastic cans such as tennis ball cans. Since the vacuum-packing and other methods of packing described above are used to produce substantially dehydrated and anoxic packages for reduced seed germination, other methods of packing known to those of skill in the art that do not reduce humidity or oxygen content can be used for a compressed growing medium that is not pre-seeded.

In another embodiment the compressed growing medium is packaged in a grow bag. The grow bag generally includes a sealed plastic bag that contains a compressed growing medium inside. The compressed growing medium (520, 620, 720) can also contain seeds (510, 610, 710) if it is a pre-seeded growing medium. The pre-seeded growing medium allows a user to just add water to begin the germination process. The plastic bag is usually made from a breathable plastic, such as co-extruded polyethylene, polypropylene. The plastic used may also be configured to be rot-resistant, UV resistant, and/or weather resistant. The grow bag obviates the need for a planter or pot because plants can be planted in the grow bag by cutting a hole in the plastic bag and planting in the exposed growing medium. Grow bags of this type are commonly used in horticulture and hydroponic green house industries for growing strawberries, tomatoes, peppers, cucumbers, and are also used in the floriculture industry for roses, gerbera and many more highly demanded seasonal and non-seasonal flowers.

The grow bag utilizing one of the compressed growing mediums described above provides many benefits over grow bags filled with traditional growing mediums. Since the growing medium (520, 620, 720) used in the grow bag contains a water-retentive polymer, the need for drainage holes can be eliminated since the polymer retains most of the moisture. The grow bags also are easy to transport and take up little space since the growing medium (520, 620, 720) is compressed. When wetted, the growing medium expands and provides an enhanced growing environment for plants. Plants grown in the grow bag filled with the growing medium described above quickly develop more elaborate and stronger root systems and have significantly reduced root diseases (recent studies strongly suggest coir inhibits *Pithium* and *Phytothora* growth). The grow bags are also recyclable and easy to handle or dispose.

The grow bag may be fluted with pre-punched drain holes. The grow bag may also contain perforated sections that can be manually torn and removed to expose the growing medium (520, 620, 720) for planting or to expose the growing medium (520, 620, 720) to improve aeration and access to sunlight and to remove the plastic bag as a barrier to plant and seedling growth. Other perforated sections can be removed to provide water drainage holes if necessary.

Generally, the compressed growing medium (520, 620, 720), whether in bricks, slabs, wafers and pellets, can be used anywhere a conventional soil or growing medium is used, including sports fields, parks, home lawns, gardens, indoor pots, outdoor pots, greenhouses, nurseries, farms, forests, and other agricultural, forest, commercial and home uses. By compressing the growing medium and packaging it to reduce germination, the seeds in the soil mixture live longer, thereby producing a higher quality product when it is deposited for its intended use.

The wafers and pellets can be deposited according to any method known to those of skill in the art, such as by hand or with machinery. According to one exemplary embodiment, after depositing the wafers and pellets, water is added to the soil mixture. When the soil mixture is wetted it becomes gel-like, expands, and bonds to the soil localizing the seedling's growth at the point the seed capsule is deposited. According to one exemplary embodiment, the compressed medium requires approximately one inch of rain is required to activate the preferred capsule matrix; however, water requirements can be varied in light of local climate conditions, seed requirements, and resulting proportions of matrix components. The resulting gel-like structure permits the exchange of oxygen and the retention of water that are essential for the germination of the seeds. It also forms a mechanical barrier to predators. Traditionally, when seeds are spread over a large area, such as a field, the seeds tend to collect at the lowest points. As the field is watered, the water running from high points in the field to the low points in the field carries the seeds away from some areas. The present exemplary growing medium neutralizes this problem as the gel-like material bonds to the soil localizing the seedling's growth at the initial point of deposit.

In addition, the encapsulating process permits the optional inclusion of nutrients, fertilizers, hormones, steroids, and fungicides selected to address local conditions. In other embodiments the soil mixture includes commercial fungicides such as Banlate™ at levels to 5000 ppm, Ridamil™ at levels to 50 ppm, and Thiaram™ at levels up to 25 ppm without toxic effect to the seeds.

Precise ratios of ingredients may be tailored to achieve the most advantageous characteristics of the growing medium for a particular use. The particular use made of the growing medium and local growing conditions will dictate the ratios chosen. Generally the growing medium, when wetted, holds sufficient water to supply the needs of the germinating seeds, bedding plants, or house plants, but does not hold so much water so as to subject the seeds or plants to a deleterious amount. The combination of component characteristics in the growing medium yields a product that has qualities of performance, convenience and cost-effectiveness.

The presence of animal by-products, especially worm castings, is a particular benefit to the compressed bulking agents. The compressed dehydrated animal by-products provide an evenly distributed supply of nutrients that are available for an extended period of time to the germinating and growing plants. The addition of perfumes or other pleasant-odor chemicals allows several animal by-products to be used in places where they would typically not be used due to the unpleasant smell.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A growing medium, comprising:
    a dehydrated bulking agent having a moisture content of less than 15%, wherein the dehydrated bulking agent further comprises a water-retentive polymer; and
    at least 5% by weight dehydrated animal by-product combined with said bulking agent;
    wherein said combined bulking agent and said dehydrated animal by-product are compressed at a volume-to-volume ratio ranging from about 3:1 to about 10:1 to form a compressed growing medium;
    wherein said compressed growing medium is free of water soluble binder; and
    wherein said compressed growing medium maintains a compressed shape until hydrated.

2. The growing medium of claim 1, wherein said animal by-product comprises dehydrated worm castings.

3. The growing medium of claim 1, wherein said bulking agent comprises coir.

4. The growing medium of claim 1, wherein said water-retentive polymer comprises a polyacrylamide.

5. The growing medium of claim 1, further comprising an odiferous element distributed in said water-retentive polymer, said odiferous element being configured to generate a pleasant odor when hydrated.

6. The growing medium of claim 1, further comprising seeds.

7. The growing medium of claim 1, further comprising one of a fertilizer, nutrients, a pesticide, an insecticide, a fungicide, or a plant growth enhancer.

8. The growing medium of claim 1, wherein the growing medium is compressed into at least one wafer, a pellet, a brick or a slab.

9. The growing medium of claim 8, wherein said wafer, pellet, brick or slab is enclosed in a dehydrated package.

10. The growing medium of claim 9, wherein said dehydrated package is vacuum-packed.

11. The growing medium of claim 1, further comprising one of a non-ionic surfactant or an emulsifier.

12. The growing medium of claim 1, wherein said compressed growing medium is ground into smaller, compressed units that maintain a compressed state until hydrated.

13. A growing medium, comprising:
    dehydrated coir having a moisture content less than 20%;
    wherein the dehydrated coir further comprises a water-retentive polymer;

a dehydrated animal by-product; and
seeds;
wherein said dehydrated coir, dehydrated animal by-product, and said seeds are mixed and compressed at a volume-to-volume ratio ranging from about 5:1 to about 10:1 to form a compressed growing medium;
wherein said compressed growing medium is free of water soluble binder;
wherein said compressed growing medium maintains a compressed shape until hydrated; and
wherein said growing medium includes dehydrated worm castings.

* * * * *